March 29, 1966   M. L. WILLIAMS   3,242,935
FOLDABLE SHELTER
Filed May 3, 1962                              2 Sheets-Sheet 1
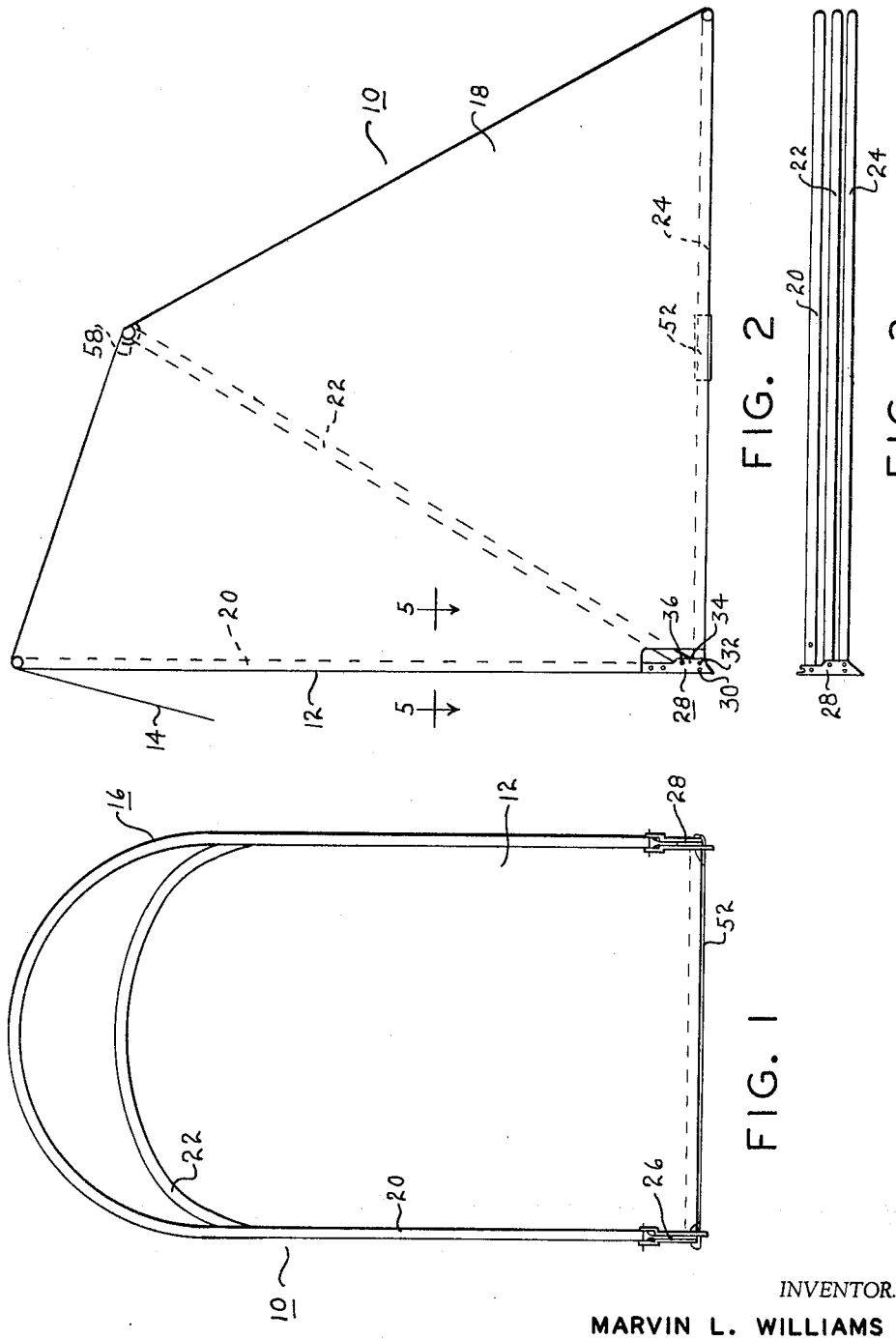
INVENTOR.
MARVIN L. WILLIAMS
BY
ATTORNEYS March 29, 1966 M. L. WILLIAMS 3,242,935
FOLDABLE SHELTER Filed May 3, 1962 2 Sheets-Sheet 2

INVENTOR.
MARVIN L. WILLIAMS
BY *Hobbs & Caxton*
ATTORNEYS

United States Patent Office 3,242,935
Patented Mar. 29, 1966

3,242,935
FOLDABLE SHELTER
Marvin L. Williams, Walkerton, Ind.
Filed May 3, 1962, Ser. No. 192,158
4 Claims. (Cl. 135—5)

The present invention relates to a shelter and more particularly to a foldable or collapsible shelter designed primarily for use in connection with ice fishing and the like.

Since ice fishing often requires the fisherman to be on the ice in places unprotected by natural conditions for extended periods of time, the fisherman often sets up shields or builds crude huts to protect him from the wind, snow and sleet and to permit the use of small heaters or fires for a measure of warmth. These shields and huts are usually more or less premanent and are used from time to time throughout the winter without removing them from the ice. Temporary or portable shields have been used, but these generally are cumbersome, heavy, hard to handle and transport, and/or are not sufficiently strong and sturdy to withstand strong winds and heavy snow and ice. Further, difficulty is sometimes experienced in anchoring or holding the shields or huts on the ice in selected locations and positions. It is therefore one of the principal objects of the present invention to provide a shelter for use in ice fishing and the like, which can readily be folded into an easily handled form for carrying and hauling, and which can readily be unfolded on the ice at the desired location and anchored to the ice without any special attachments and without the use of tools or other equipment.

Another object of the invention is to provide a shelter for one to three people, which is light in weight and easily carried over the ice and set up in any position to give effective protection to the occupants, and which can be placed over or near the fishing hole in the ice and thereafter completely enclosed for maximum protection to the fisherman.

Still another object is to provide a sportman's shelter for use as a shelter and blind in hunting deer, wild ducks and geese, which can be carried into difficult to reach places, set up on uneven terrain and unfirm ground, readily anchored or secured in place, and thereafter easily moved from one place to another.

A further object is to provide a shelter of the aforesaid type which is so constructed that it can be used as a separate unit for one to three persons or can be joined to and used in connection with another unit to double the capacity of the shelter.

Another object of the invention is to provide a relatively simple, easily fabricated and assembled, foldable and portable shelter which can be used effectively for a variety of different purposes and which can easily be stored and transported on or in a vehicle, occupying only a small amount of otherwise usuable space.

Additional objects and advantages of the invention will become apparent from the following description and accompanying drawings, wherein:

FIGURE 1 is a front elevational view of the present foldable shelter, showing it in its fully unfolded position;

FIGURE 2 is a side elevational view of the foldable shelter shown in FIGURE 1, showing the shelter in its fully unfolded position;

FIGURE 3 is a side elevational view of the foldable shelter shown in FIGURES 1 and 2, the shelter being shown in its fully folded position;

Figure 5:
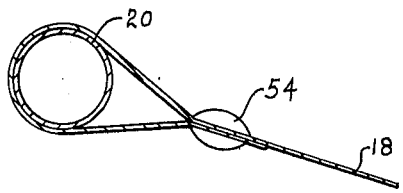
FIGURE 5 is a fragmentary horizontal cross sectional view of the present foldable shelter, the section being taken on line 5—5 of FIGURE 2.
Figure 6:
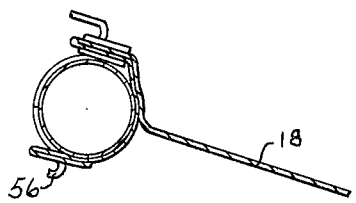
FIGURE 6 is a horizontal cross sectional view similar to the view shown in FIGURE 5 illustrating a modification in the present foldable shelter.
Figure 4:
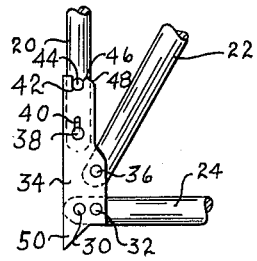
FIGURE 4 is an enlarged fragmentary elevational view of a portion of the frame forming the present foldable shelter, the members shown in FIGURE 4 representing the shelter in its fully unfolded position.

Referring more specifically to the drawings and to FIGURES 1 and 2 in particular, numeral 10 designates generally the present foldable structure, shown in the two figures in its fully unfolded position and in condition for use as an ice shelter or deer and duck hunting blind. The front 12 of the shelter may be fully open as illustrated in FIGURE 1 or may be provided with a flap 14 or the like, extending downwardly from the top of the shelter, as shown in FIGURE 2, the flap being either the full length or any portion thereof as desired. The shelter consists basically of a frame, generally designated by numeral 16 having secured thereto a cover 18 of plastic, rubberized cloth, canvas, or other suitable water proof, highly flexible and readily foldable material.

The frame as illustrated in the drawings consists of three U-shaped members 20, 22 and 24, pivoted to joints 26 and 28 at the lower left and right-hand front corners, as viewed in FIGURE 1. Member 20 is an inverted U-shaped member standing substantially vertically when the shelter is fully unfolded, member 24 is a U-shaped member of the same size as member 20 and lying substantially horizontally when the shelter is fully unfolded, and member 22 is spaced intermediately between members 20 and 24 and held in the desired position by cover 18 to give substantial support and reinforcement to the cover. One or more U-shaped members may be inserted between members 20 and 22, or 22 and 24, if additional strength and stability are required for a particular use. The frame members 20, 22 and 24 are preferably formed of thin wall tube material, preferably of aluminum or aluminum alloy material. As illustrated in FIGURE 3, when the frame is fully folded, the three members 20, 22 and 24 lie superposed on one another with the two ends being in alignment with joints 26 and 28 in vertical position. When the structure is fully folded, it forms a U-shaped pack which can easily be placed over a fisherman's or hunter's shoulder to carry the structure with little effort from a vehicle to the desired location.

One of the main features of the present invention is the structure of joints 26 and 28, which permit the shelter to be assembled and disassembled easily and readily without the use of any tools and which retain the structure firmly in its unfolded position when it has been set up at the desired location. As shown in FIGURES 1 through 4, member 24 is joined rigidly to joints 26 and 28 at its two ends by rivets 30 and 32, Thus forming a rigid L-shaped substructure consisting of member 24 and member 34 of the two joints. Member 22 is pivotally joined to member 34 by a rivet 36, extending through member 34 and through the respective end of member 22, the pivoted joint formed by rivet 36 permitting member 22 to fold from the position shown in FIGURE 2 to the position shown in FIGURE 3.

Member 20 is pivotally connected to member 34 by a rivet 38 extending through the respective end of member 20 and through an elongated vertical slot 40 in member 34, this rivet and slot structure permitting member 20 to be moved longitudinally with respect to member 34. The upper end of member 34 is provided with a slot 42 for receiving a rivet or pin 44 extending through the respective end of member 20 and being adapted to seat in slot 42 when member 20 is moved to its vertical position. With the elongated slot 40 and the open upper end of slot 42, member 20 can be lifted vertically sufficiently to permit rivet or pin 44 to pass over upper end 46 of member 34 as member 20 is pivoted on rivet 38 from the position shown in FIGURE 2 to the position shown in FIGURE 3. The edge of member 34 is preferably beveled at 48 in order to assist in raising member 20 from the folded position to its fully unfolded position shown. As pin 44 passes over the top 46 of member 34, it, together with member 20, drops downwardly, seating pin 44 firmly in slot 42, thus holding member 20 in its vertical position and parallel to member 34. It is therefore seen that members 20 and 34 form an L-shaped structural relationship with horizontal member 24.

One of the principal features of the present invention is the spike element 50 on the lower end of member 34. This spike member is easily pressed into the ice or ground after the shelter has been unfolded, securing the shelter firmly in place and preventing unintentional moving or shifting of the shelter from the wind or by accidential bumping by the shelter occupants. A further securing means consists of a strap 52 permanently secured to one leg of U-shaped member 24 and releasably secured to the other leg of member 24. This strap 52 is utilized by placing equipment used by the occupants on it to assist in preventing the shelter from shifting or otherwise moving when subjected to high winds. The strap may also be used to hold members 20, 22 and 24 together when the shelter is in its folded position.

Cover 18 may be secured to members 20 and 24 by any suitable means such as snap-buttons 54, as shown in FIGURE 5, or by a cord 56 lacing the edges of the cover to the frame members. Member 22 may be secured to the cover by one or more straps 58 attached to the internal side of the cover.

Figure 9:
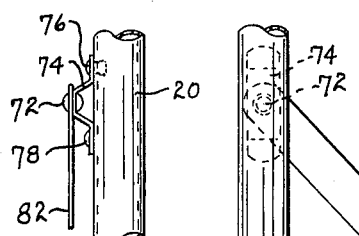
FIGURE 9 is a fragmentary side elevational view of the frame structure shown in FIGURE 7.
Figure 7:
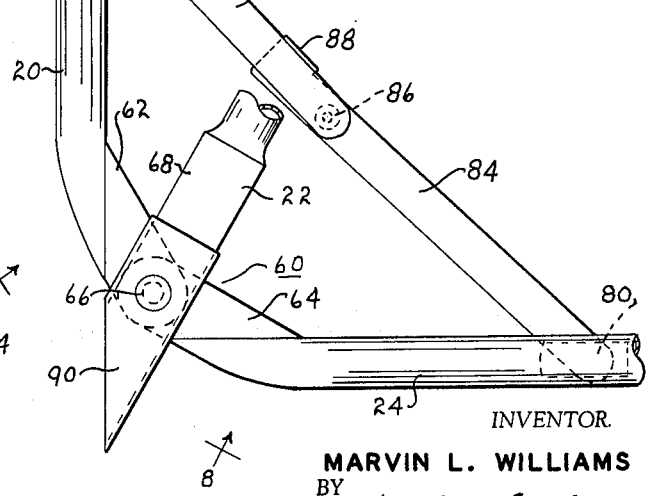
FIGURE 7 is an enlarged fragmentary view of a modified form of a structure forming the present foldable shelter.
Figure 8:
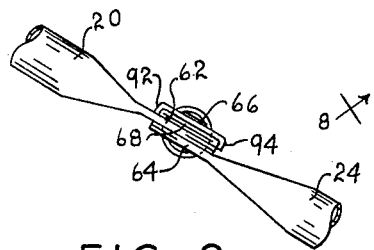
FIGURE 8 is a fragmentary elevational view of a portion of the structure shown in FIGURE 7, the view being taken from the position shown by lines 8—8 of FIGURE 7.

In the form shown in FIGURES 7, 8 and 9, a modified joint structure is used in conjunction with frame members 20, 22 and 24, the modified form consisting of a pivoted joint 60 formed by the flattened ends 62 and 64 of members 20 and 24, and flattened end 68 of member 22 held together by a rivet 66 extending through the flattended ends of the members. The vertical member 20 and horizontal member 24 are held rigidly in their unfolded position by a bracket or toggle 70, pivoted at its upper end by rivet 72 to a fixture 74, which in turn is secured to member 20 by rivets 76 and 78, and pivoted at its lower end by a similar rivet and bracket 80 mounted on member 24. Toggle 70 consists of two sections 82 and 84 pivotally connected to one another by a rivet 86 and held in its over center position when expanded by a lug 88.

When the shelter embodying the joint structure shown in FIGURES 7, 8 and 9 is folded, the toggle is broken such that the two sections 82 and 84 extend inwardly away from the pivoted joint, and members 20 and 22 are folded downwardly on member 24. In this modified form, a spike or spur 90 for penetrating the ice or ground is provided on each end of member 22. This spike may be formed as an integral part of member 22 or may be joined thereto, as illustrated in FIGURES 7 and 8, with flanged portions 92 and 94 extending over the edge of the flattended portion of member 22 so that the spike is held in the position shown in FIGURE 7 when the shelter is unfolded and will move to a horizontal position when member 22 is folded downwardly onto member 24.

While two embodiments of the present invention have been described in detail herein, various changes and further modifications may be made to satisfy requirements.

I claim:
1. A foldable shelter, comprising a vertical horizontal and intermediate generally U-shaped frame members, of one-piece tubular construction, a joint means attached to each end of said frame members, each joint means having a vertical joint member with a slot in the top thereof and an elongated slot spaced downwardly from the top, said horizontal frame member being rigidly joined to said joint member and said vertical and intermediate frame members being pivotally joined to said joint member, said vertical member having a pin extending into said elongated slot and a pin adapted to seat in the slot in the top of said joint member for retaining said frame member in vertical position, a spike element on the lower side of each of said joint members, a flexible cover of plastic, water repellent material secured to said frame members and adapted to fold with said frame members, a strap between the two arms of said horizontal member spaced from the ends thereof, and a releasable means for connecting said strap to one of said arms.

2. A foldable shelter, comprising vertical, horizontal and intermediate generally U-shaped frame members, a joint means attached to each end of said frame members, each joint means having a vertical joint member with a slot in the top thereof and an elongated slot spaced downwardly from the top, said horizontal frame member being joined rigidly to said joint member and said vertical and intermediate frame members being pivotally joined to said joint members, said vertical frame member having a pin extending into said elongated slot and a pin adapted to seat in the slot in the top of said joint member for retaining said frame member in vertical position, a spike joined rigidly with said joint member and projecting downwardly therefrom, and a water repellent flexible cover secured to said frame member.

3. A foldable shelter, comprising vertical, horizontal and intermediate generally U-shaped frame members, a joint means attached to each end of said frame members, each joint means having a vertical joint member, said horizontal frame member being rigidly joined to said joint member and said vertical and intermediate frame members being pivotally joined to said joint member, means for releasably retaining said vertical frame member in position, a spike element joined rigidly to the lower side of each of said joint members, and a water repellent flexible cover secured to said frame member.

4. A foldable shelter, comprising vertical, horizontal and intermediate generally U-shaped frame members, a joint means attached to each end of said frame members, each joint means having a vertical joint member with a spike on its lower end, said horizontal frame member being joined rigidly to said joint member and said vertical and intermediate frame members being pivotally joined to said joint member, said vertical frame member having a releasable pin connecting said joint member with said vertical member to retain the latter in its unfolded position, and a water repellent flexible cover secured to said frame member.

References Cited by the Examiner
UNITED STATES PATENTS

| | | | |
|---|---|---|---|
| 1,650,111 | 11/1927 | Byne | 135—4 |
| 1,696,245 | 12/1928 | Manly. | |
| 2,014,336 | 9/1935 | Marthaler | 135—7.1 |
| 2,543,597 | 2/1951 | Peery | 135—7.1 |
| 2,936,771 | 5/1960 | Marchfield et al. | 135—5 |
| 3,017,893 | 1/1962 | Greenbie | 135—4 |
| 3,082,780 | 3/1963 | Macy | 135—4 |

HARRISON R. MOSELEY, *Primary Examiner.*

C. S. KAISMAN, L. J. SANTISI, *Assistant Examiners.*